Figure 3:
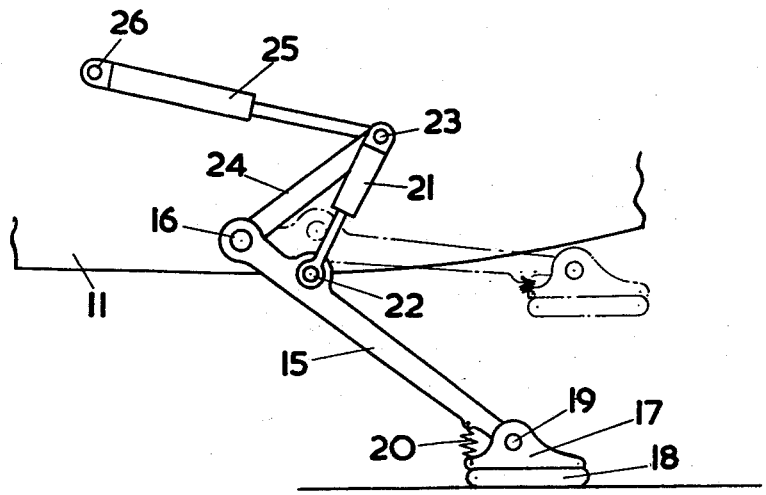

Dec. 29, 1964     W. J. G. PINSKER     3,163,381
AIRCRAFT UNDERCARRIAGES
Filed Nov. 24, 1961     2 Sheets-Sheet 1
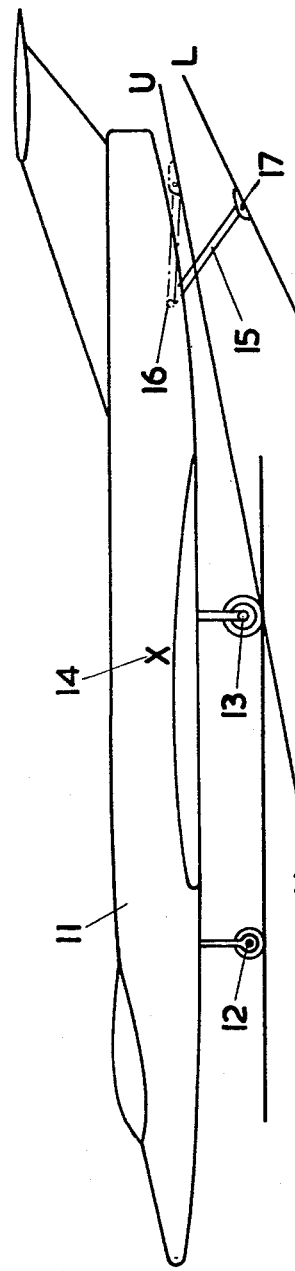
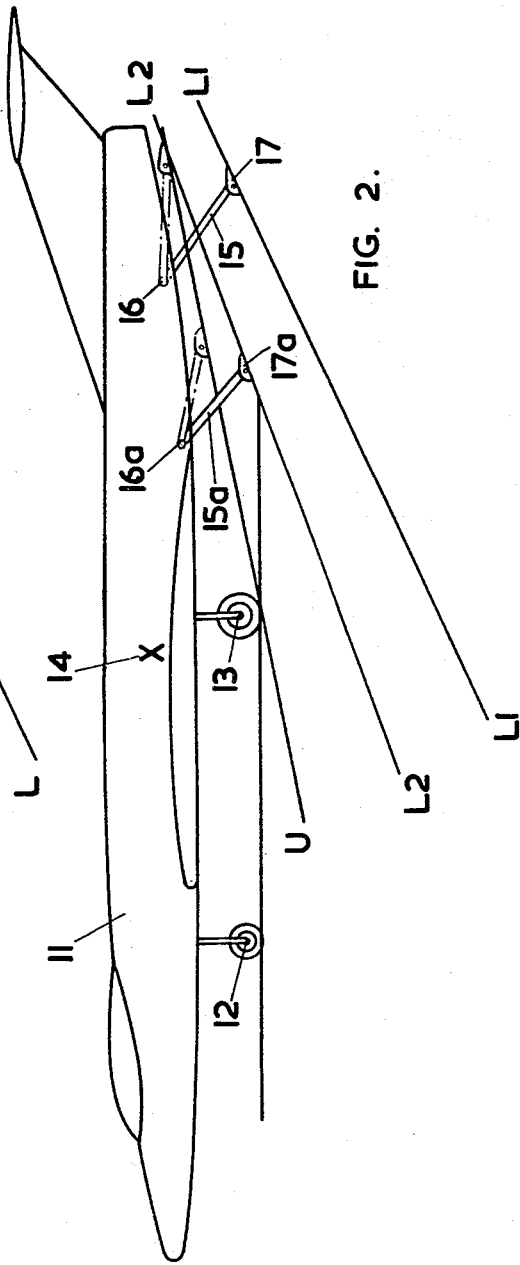
Werner Joseph Georg Pinsker
Inventor
By Cushman, Darby & Cushman
Attorneys Dec. 29, 1964   W. J. G. PINSKER   3,163,381
AIRCRAFT UNDERCARRIAGES Filed Nov. 24, 1961   2 Sheets-Sheet 2

Werner Joseph Georg Pinsker
Inventor
By
Cushman, Darby, Cushman
Attorneys

United States Patent Office 3,163,381
Patented Dec. 29, 1964

3,163,381
AIRCRAFT UNDERCARRIAGES
Werner Joseph Georg Pinsker, Bedford, England, assignor to National Research Development Corporation, London, England
Filed Nov. 24, 1961, Ser. No. 154,695
Claims priority, application Great Britain Nov. 28, 1960
5 Claims. (Cl. 244—100)

This invention relates to aircraft undercarriages.

Conventionally, in addition to maintaining ground clearance at the lateral and rear extremities within given limits of pitch and bank at touch down, the undercarriage of an aircraft has to absorb the landing impact energy associated with the vertical component of velocity at touch down and also to absorb the energy of the relatively small impact loads that are experienced after landing, for example during taxiing.

For some aircraft with which a steeply nose up pitch attitude at touch down is desirable or essential (for example, tailless aircraft with small aspect ratio wings) the amidships undercarriage means, at least, must be made very long (i.e. high when lowered ready for use) and correspondingly robust, and thus must be substantially heavier and occupy considerably more space when retracted within the external confines of the aircraft than is otherwise desirable. The consequent reduction in payload may in extreme cases be economically unacceptable. Also, in the case of very large aircraft, the amidships undercarriage means is necessarily designed primarily for absorption of the landing impact and may well have to be so stiff as to transmit to the airframe during taxiing such impact loads as may appreciably reduce the fatigue life of the structure.

According to the invention aircraft landing impact absorber means are provided for service in rear of undercarriage means to absorb a substantial proportion at least of the landing impact energy before the undercarriage means come into operation.

In addition to absorbing landing impact energy the landing impact absorber means will necessarily have the effect of reducing the pitch attitude before the undercarriage comes into contact with the ground. The extent to which it does so in any particular case is dependent upon the maximum force it is capable of transmitting and also largely dependent upon the location of its effective point of attachment to an aircraft.

In general, the landing impact absorber means will have a long operative or working stroke and be capable of transmitting only correspondingly low forces.

The landing impact absorber means for any particular aircraft are preferably such as to absorb a large proportion or substantially the whole of the landing impact energy so that the stiffness and, at least in the case involving a steeply nose up pitch attitude at touch down, also the height, of the undercarriage means of the aircraft may be much reduced as compared with the acceptable minima without the landing impact absorber means. With reduced undercarriage height the elevation required for take off may be substantially smaller and the amidships undercarriage means may be closer to the centre of gravity of an aircraft than is appropriate for safety against pitching back onto the tail when a high undercarriage is used, and, with the consequently smaller nose lifting moment the elevator power may be reduced accordingly.

Preferably also, the impact absorber means are such in relation to the undercarriage means forwardly thereof and to the aircraft with which it is to be used, that even when fully lowered and extended, the landing impact absorber means are clear of the ground during taxiing.

In some cases the landing impact absorber means may extend for a substantial distance to port and to starboard to reduce excessive bank at touch down by coming into contact with the ground at the low side first if and when bank is excessive. For example, said means may comprise two landing impact absorber units whose lower ends are disposed at substantial distances to port and to starboard, respectively.

The landing impact absorber means according to the invention may conveniently take the form of one or more swinging arm type impact absorber units about whose reaction pivot(s) retraction is effected.

The landing impact absorber means may have a position intermediately of the fully retracted and fully lowered positions, in which to serve as an emergency bumper during take off and be normally clear of the ground when the pitch attitude is appropriate for the actual take off. The landing impact absorber means may have skids, instead of wheels, and these may be provided with shoes, for example of rubber.

The invention is primarily applicable to aircraft whose nose up pitch attitude at touchdown is substantially greater than that required for take off, and thus to tailless and other aircraft without landing flaps, and the reduction of undercarriage height made possible by the invention will clearly be greatest where the pitch attitude at touch down is necessarily steeply nose up, for example in the case of aircraft with small aspect ratio wings. However, quite apart from reduction of undercarriage height, the reduction in undercarriage stiffness made possible by the landing impact absorber means reduces the landing and taxiing loads which are transmitted to the airframe and in some cases this may even permit the weight of the structure itself to be reduced to a useful extent without at the same time reducing its fatigue life. In some cases the landing impact absorber means may make it possible substantially to reduce the "flare out" manoeuvre effected by the pilot just prior to touch down, or even to land without any such flare out, thus enabling the pilot (or an automatic landing system) more precisely to determine the point in the length of a runway at which touch down actually occurs, enabling runway lengths to be more fully utilized, and reducing the risk of "undershooting" or "overshooting."

Figure 4:
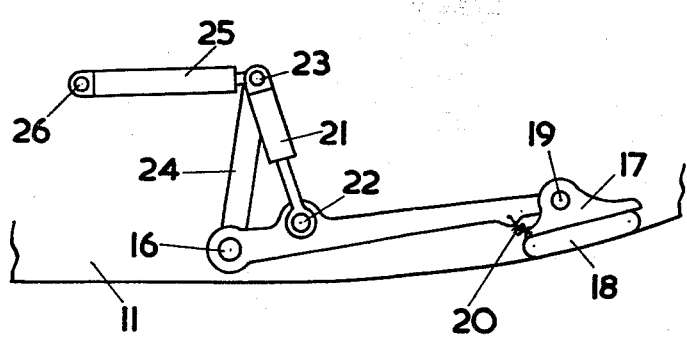

The invention is illustrated by way of example in the accompanying diagrammatic drawings which are not to scale and of which:

FIGURES 1 and 2 show in side elevation two aircraft with single and double (landing impact absorber means) respectively, and FIGURES 3 and 4 show also in side elevation one form of swinging arm type landing impact absorber for said means, in its lowered or operative and in its retracted positions, respectively.

As shown in FIGURES 1 and 2 an aircraft indicated generally at 11 has conventional type forward or nose wheel and amidships undercarriage means indicated at 12 and 13, respectively, the amidships portion being located when lowered for use, just aft of the centre of gravity of the aircraft which is indicated at 14.

As shown in FIGURE 1, landing impact absorber means take the form of a single retractable swinging arm type impact absorber which comprises an arm 15 pivotally attached at 16 to the airframe structure and having a skid shoe 17 at its free end. The upper position shown indicates the upper limit and the lower position shows the lower limit of operative stroke of the absorber. On landing, it is the skid shoe 17 that first touches the ground, the pitch angle at the instant of contact being of the order indicated by the ground line L—L which represents the angular position of the ground relative to the aircraft at that instant. The impact of the skid shoe 17 upon the ground shifts the arm 15 about its pivot 16 and a large proportion of the energy associated with the vertical component of the aircraft's velocity is thus absorbed; also the aircraft is tilted nose down in pitch until, when the amidships undercarriage means 13 meet the ground the arm 15 is at or near the upper position shown and the reduced pitch angle is nearly that indicated by the line U—U which represents the angular position of the ground relative to the aircraft when the amidships undercarriage means 13 have been compressed to the same extent as when the aircraft is actually at rest upon the ground, when the arm 15 is once again at the lower position shown with the skid shoe clear of the ground.

The FIGURE 2 example is similar except for the provision of a second swinging arm type shock absorber unit, having an arm 15a, pivot 16a and skid shoe 17a located between the amidships undercarriage means 13 and the first arm 15. In FIGURE 2 the ground line L1—L1 indicates the pitch attitude at the instant of contact of the skid shoe 17 of the first arm 15 with the ground, the line L2—L2 indicates the reduced pitch attitude at the instant of contact of the skid shoe 17a of the arm 15a with the ground when the arm 15 has almost if not quite, reached the upper position shown, and, as in FIGURE 1, the line U—U indicates the pitch attitude very shortly after the amidships wheels 13 have reached the ground (and have been raised to the same extent as they are when the aircraft is at rest thereon and upon the nose wheel 12). Ideally, at the moment when the amidships wheels 13 come into contact with the ground, both the skid shoes 17 and 17a will be in contact with the ground at or near the upper positions shown. When the aircraft has settled down in its taxiing or rest position, however, both the arms 15 and 15a will be in the lower positions shown with their skid shoes 17 and 17a clear of the ground.

Referring now to FIGURES 3 and 4 of the drawings, the swinging arm type impact absorber there shown has an arm 15 with a pivotal attachment 16 to the aircraft and a skid shoe 17. This latter has a pad or sole 18 of rubber at its undersurface and is pivotally attached at 19 to the free end of the arm 15 under the influence of a spring 20 which tends to tilt it rear end down.

A conventional oleo strut 21 extends between pivotal connections 22 and 23, respectively, to the arm 15 and to the free end of the rigid member 24 which is pivotal about the pivotal attachment 16 of the arm 15 to the airframe 11; and, a retraction jack 25 extends from a pivotal anchorage thereof to the airframe to the pivotal connection 23 of the oleo strut 21 to the rigid member 24. In FIGURE 3 the arm 15 is indicated in broken lines at the upper limit of its working stroke and in full lines at the lower limit of its stroke just after the shoe 17 has come into contact wtih the ground. The absorber is shown fully retracted in FIGURE 4.

In the examples illustrated the undercarriage height is substantially less than is customarily the case for aircraft without landing impact shock absorber means in rear of the undercarriage means so that the elevation required for take off is reduced correspondingly. Moreover, the spacing of the amidships undercarriage means from the centre of gravity is substantially less than is required for an aircraft with a relatively high undercarriage for safety against pitching back on to the tail. Thus the nose lifting moment and the elevator power required are substantially reduced also.

I claim:
1. An aircraft having landing gear including nose undercarriage gear far forward of the center of gravity of the aircraft amidships undercarriage gear close to and in rear of the center of gravity to support the aircraft on the ground, and impact absorber gear far aft of the center of gravity to absorb the greater part of the landing impact energy before the amidships undercarriage gear contacts the ground each time the aircraft lands.

2. In an aircraft having undercarriage gear far forward of the center of gravity of the aircraft and amidships undercarriage gear close to and aft of said center of gravity, said undercarriage gears both engaging the ground and supporting said aircraft when the same is at rest, the improved construction permitting said undercarriage gears to be of light-weight construction which absorbs only a small portion of impact energy during landing comprising means separate from said undercarriage gears and aft of said amidships undercarriage gear for temporarily engaging the ground prior to engagement with the ground of said amidships undercarriage gear during normal landing of the aircraft and simultaneously absorbing a substantial portion of the landing shock prior to engagement with the ground of said undercarriage means, said means including a yielding impact absorber having a substantial work stroke.

3. An aircraft as in claim 2 wherein said means for engaging the ground includes means for retracting the same to a position nearer the aircraft to serve as an emergency bumper during take-off.

4. An aircraft as in claim 2 wherein said undercarriage gears include means providing a shock absorbing work stroke and wherein the work stroke of said yielding impact absorber is longer than the work stroke of said undercarriage gears.

5. An aircraft having main undercarriage gear for entirely supporting said aircraft a given distance above the ground and for absorbing only a minor proportion of the impact energy during normal landings, said main undercarriage gear including a forward portion positioned forward of the center of gravity of the aircraft and an amidships portion positioned close to and in the rear of the center of gravity of the aircraft, and at least one impact absorber means aft of and separate from the amidships portion of said undercarriage gear for temporarily engaging the ground during landing to absorb a major portion of landing shock prior to engagement of any part of said amidships portion of said undercarriage gear with the ground.

References Cited in the file of this patent
UNITED STATES PATENTS

| | | |
|---|---|---|
| 1,121,762 | Riotte | Dec. 22, 1914 |
| 1,376,912 | Ajello | May 3, 1921 |
| 1,882,416 | Gastwirth | Oct. 11, 1932 |
| 2,394,496 | Stephan | Feb. 5, 1946 |
| 3,058,702 | Sharples | Oct. 16, 1962 |
| 3,089,667 | Gosslau et al. | May 14, 1963 |

FOREIGN PATENTS

| | | |
|---|---|---|
| 732,486 | Germany | Mar. 5, 1943 |